US010691193B2

(12) United States Patent
Wu

(10) Patent No.: US 10,691,193 B2
(45) Date of Patent: Jun. 23, 2020

(54) METHOD, APPARATUS AND COMPUTER-READABLE MEDIUM FOR TERMINAL CONTROL

(71) Applicant: Beijing Xiaomi Mobile Software Co., Ltd., Beijing (CN)

(72) Inventor: Ke Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 47 days.

(21) Appl. No.: 15/937,862

(22) Filed: Mar. 28, 2018

(65) Prior Publication Data
US 2018/0329474 A1 Nov. 15, 2018

(30) Foreign Application Priority Data

May 12, 2017 (CN) .......................... 2017 1 0342403

(51) Int. Cl.
G06F 1/00 (2006.01)
G06F 1/3237 (2019.01)
G06F 1/16 (2006.01)
G06F 1/3218 (2019.01)
G06F 1/3246 (2019.01)
G06F 1/3228 (2019.01)
G06F 1/3206 (2019.01)

(52) U.S. Cl.
CPC .......... G06F 1/3237 (2013.01); G06F 1/1677 (2013.01); G06F 1/3206 (2013.01); G06F 1/3218 (2013.01); G06F 1/3228 (2013.01); G06F 1/3246 (2013.01); G06F 1/1616 (2013.01)

(58) Field of Classification Search
CPC ..... G06F 1/3237; G06F 1/3206; G06F 1/1616
USPC .......................................................... 713/324
See application file for complete search history.

(56) References Cited

U.S. PATENT DOCUMENTS 7,480,813 B2 * 1/2009 Asoh ..................... G06F 1/1616
713/324
2007/0180282 A1 8/2007 Kim
(Continued)

FOREIGN PATENT DOCUMENTS

CN 1362665 A 8/2002
CN 101248404 A 8/2008
(Continued)

OTHER PUBLICATIONS

Extended European search report issued in corresponding European Application No. 18169619.6, dated Oct. 8, 2018, 11 pages.
(Continued)

Primary Examiner — Mohammed H Rehman
(74) Attorney, Agent, or Firm — Arch & Lake LLP

(57) ABSTRACT

The disclosure is related to a method, an apparatus and a computer-readable medium for controlling a terminal. The method includes: obtaining a cover closing instruction where the cover closing instruction indicates that an upper cover and a lower cover of the terminal are closed; obtaining, in response to the cover closing instruction, a program running on the terminal; and determining an operation to be performed by the terminal based on the program running on the terminal, where the operation to be performed by the terminal includes any one of: shutdown, sleep, maintaining normal operation, or screen off.

9 Claims, 10 Drawing Sheets

(56) References Cited

U.S. PATENT DOCUMENTS

| | | | | |
|---|---|---|---|---|
| 2009/0245485 | A1* | 10/2009 | Locker | H04M 1/64 379/88.22 |
| 2012/0110360 | A1* | 5/2012 | Lin | G06F 1/3215 713/324 |
| 2012/0303990 | A1* | 11/2012 | Nanda | G06F 1/3228 713/324 |
| 2013/0007496 | A1 | 1/2013 | Tamura | |
| 2013/0276094 | A1* | 10/2013 | Prat | H04L 63/0245 726/15 |
| 2015/0123875 | A1* | 5/2015 | Wang | G09G 5/003 345/1.3 |

FOREIGN PATENT DOCUMENTS

| | | |
|---|---|---|
| CN | 101398697 A | 4/2009 |
| CN | 102981791 A | 3/2013 |
| CN | 102981791 B | 9/2015 |

OTHER PUBLICATIONS

Dario Freddi "PowerDevil, a Power Management Daemon" Aug. 26, 2016, XP055510805, Retrieved from the Internet: URL: https://docs.kde.org/trunk5/en/kde-workspace/kcontrol/powerdevil/index.html [retrieved on Sep. 27, 2018], 4 pages.

Hans Anonymous "How do you use activities? | Who says Penguins Can't Fly'?" May 2, 2013, XP055510991, Retrieved from the Internet: URL: https://web.archive.org/web/20130502063527/http://blog.hanschen.org:80/2009/11/17/how-do-you-use-activities/ [retrieved on Sep. 28, 2018], 24 pages.

Summons of Oral Proceedings corresponding to European Patent Application No. 18169619.6 dated Feb. 10, 2020, (9p).

First Office Action to Chinese Patent Application No. 201710342403.8, dated Oct. 28, 2019 with English concise explanation, (10p).

Second Office Action issued to Chinese Application No. 201710342403.8, dated May 6, 2020 with English translation (17p).

* cited by examiner

METHOD, APPARATUS AND COMPUTER-READABLE MEDIUM FOR TERMINAL CONTROL

CROSS-REFERENCE TO RELATED APPLICATION

This application is based on and claims priority to Chinese Patent Application No. 201710342403.8, filed on May 12, 2017, the entire content of which is incorporated herein by reference in its entirety for all purposes.

TECHNICAL FIELD

The present disclosure generally relates to electronic device technology, and more particularly to a method, apparatus and computer-readable medium for terminal control.

BACKGROUND

With the development of communication technology, more and more users choose to use laptops for routine work and study.

Mobility and easy access of the laptop may greatly facilitate people's daily life. A user may directly close the cover of the laptop and put the laptop into a bag if the user has to be occupied by something else, and then the laptop may automatically go to sleep state. When the user uses the laptop next time, the laptop may reproduce a page which is shown on the screen before the cover is closed and the user may use the lap continually.

As the screen of the laptop is small, when the user views a document using the laptop, an external display with a larger screen may be used. However, in order to maintain normal operation of the laptop, the screen of the laptop needs to be kept on for a long time, resulting in a big power consumption of the laptop. When the user is using the laptop to download a video, if the user closes the cover of the laptop, the laptop may go to sleep state, and the sleep state of the laptop may lead to the interruption of download and thus the download efficiency is low. As such, the setting that the laptop immediately go to sleep state when its cover is closed cannot meet various demands of users, and thus the user experience may not be good.

SUMMARY

A method and apparatus for terminal control are provided in the disclosure.

According to a first aspect of the present disclosure, a method for controlling a terminal is provided. The method may include: obtaining a cover closing instruction for the terminal, where the cover closing instruction indicated that an upper cover and a lower cover of the terminal are closed; obtaining, in response to the cover closing instruction, a program running on the terminal; and determining an operation to be performed by the terminal based on the program running on the terminal, where the operation to be performed by the terminal may include any one of: shutdown, sleep, maintaining normal operation, and screen off.

According to a second aspect of the present disclosure, an apparatus for controlling a terminal is provided. The apparatus may include a processor and a memory storing instructions that are executable by the processor. The processor may be configured to obtain a cover closing instruction for the terminal, where the cover closing instruction indicates that an upper cover and a lower cover of the terminal are closed; obtain, in response to the cover closing instruction, a program running on the terminal; and determine an operation to be performed by the terminal based on the program running on the terminal, where the operation to be performed by the terminal comprises any one of: shutdown, sleep, maintaining normal operation, or screen off.

According to a third aspect of the present disclosure, a non-transitory computer-readable storage medium having a computer program stored for controlling a terminal there is provided. The computer program, when executed by a processor, may cause the processor to perform obtaining a cover closing instruction for the terminal, where the cover closing instruction indicates that an upper cover and a lower cover of the terminal are closed; obtaining, in response to the cover closing instruction, a program running on the terminal; and determining an operation to be performed by the terminal based on the program running on the terminal, where the operation to be performed by the terminal comprises any one of: shutdown, sleep, maintaining normal operation, or screen off.

It is to be understood that both the forgoing general description and the following detailed description are exemplary and illustrative only, and do not limit the present disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Examples are described in detail herein, examples of which are illustrated in the accompanying drawings. The following description refers to the accompanying drawings in which same numbers in different drawings represent same or similar elements unless otherwise described. The implementations set forth in the following description of examples do not represent all implementations consistent with the disclosure. Instead, they are merely examples of apparatuses and methods consistent with aspects related to the disclosure as recited in the appended claims.

The technical solutions provided by the examples of the present disclosure relates to a terminal, which may be a laptop, a flip phone, a tablet with a portable keyboard installed, or other devices whose upper cover and lower cover enable to be closed. The examples of the present disclosure are not limited in this respect. In the technical solutions provided by the examples of the present disclosure, after the user closes the upper cover and the lower cover of the terminal, the terminal may determine, based on the program currently running on the terminal, whether to shut down, sleep, maintain normal operation, or screen off. As a result, operation flexibility of the terminal is improved based on the current situation, various needs of users can be met and thus the user experience is improved.

Figure 1A:
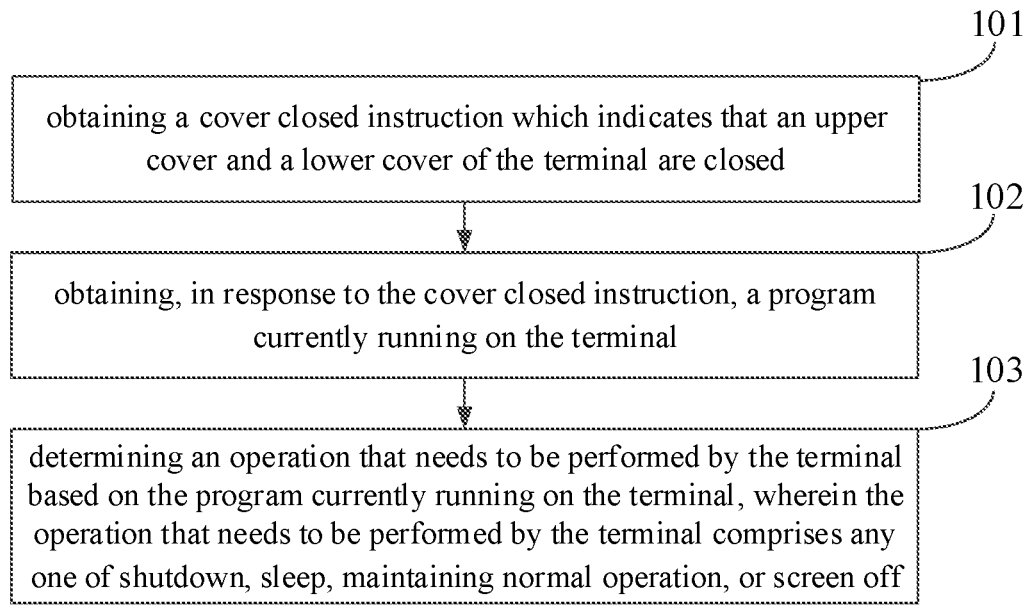
FIG. 1A is a flow diagram of a method for terminal control according to an example.

FIG. 1A is a flow diagram of a method for terminal control according to an example. The method may be applied to a terminal. The examples of the present disclosure are illustrated by taking a laptop as an example. As shown in FIG. 1A, the method for terminal control includes steps 101 to 103.

In step 101, a cover closed instruction is obtained. The cover closed instruction indicates that the upper cover and the lower cover of the terminal are closed.

For example, in the case that the terminal is a laptop or a flip phone, the upper cover of the terminal is a side where a display is provided, and the lower cover of the terminal is a side where a keyboard is provided. For example, in the case that the terminal is a tablet provided with a portable keyboard, the upper cover of the terminal is the tablet itself, and the lower cover of the terminal is the portable keyboard. The upper cover and the lower cover of other terminals may be distinguished based on usage of the user, which is not limited in the examples of the present disclosure.

For instance, in a laptop, a distance sensor is provided in the lower cover of the laptop. When the user uses the laptop, the distance sensor may detect the distance between the lower cover and the upper cover in real time. When the distance sensor detects that the distance between the lower cover and the upper cover is less than or equal to a preset distance threshold, it is determined that a cover closed instruction is received.

Alternatively, when the user remotely operates the laptop, a cover closed instruction may also be sent to the laptop through another control terminal.

In step 102, a program currently running on the terminal is obtained in response to the cover closed instruction.

For example, when the laptop determines that the cover closed instruction is obtained, it may obtain the program currently running on the terminal. The program currently running on the terminal may include a program being used by the user or a program running in background. Specifically, the laptop may determine the program currently running on the terminal based on a process being processed in the processor.

In step 103, an operation that needs to be performed by the terminal is determined based on the program currently running on the terminal. The operation that needs to be performed by the terminal may include any one of shutdown, sleep, maintaining normal operation, or screen off.

For example, the terminal needs perform different operations when it receives the cover closed instruction due to different programs currently running on the terminal. For example, if the cover closed instruction is received when the user is browsing a webpage, the laptop may save the webpage currently browsed by the user and then directly shutdown. When the laptop is turned on next time, it will show the webpage saved in a browser. In this way, stand-by power consumption is saved. For example, if the cover closed instruction is received when the user is watching a video, the laptop may record playing position of the video and then sleep. When the user opens the laptop again, the laptop may be quickly woken up and the video may be watched. For example, if the cover closed instruction is received when the user is downloading a document or a video, in order to avoid interruption of the download, the laptop may maintain normal operation status, and thus download speed can be enhanced. In summary, different operations that need to be performed by the terminal may be determined based on different programs currently running on the terminal, and thus various demands of the user can be met.

In the technical solutions provided in the examples of the present disclosure, after the user closes the upper cover and the lower cover of the terminal, the terminal may determine, based on the program currently running on the terminal, whether to shut down, sleep, maintain normal operation, or screen off. As a result, operation flexibility of the terminal is improved based on the current situation, various needs of users can be met and thus the user experience is improved.

Figure 1B:
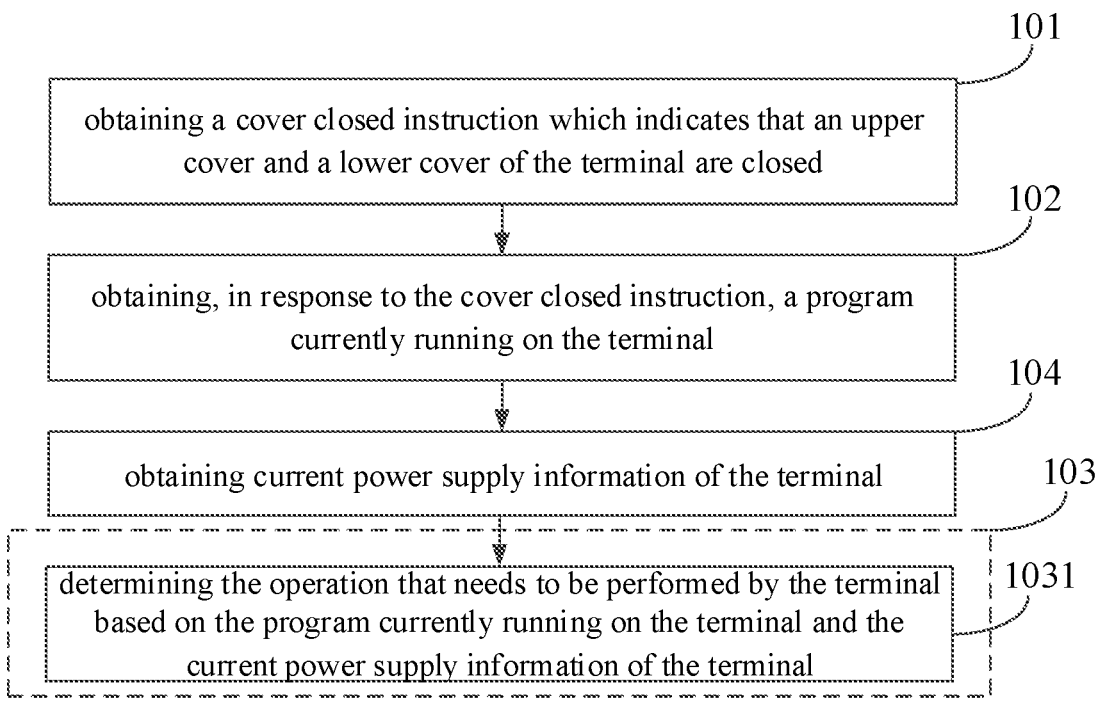
FIG. 1B is a flow diagram of a method for terminal control according to an example.

In an example, as shown in FIG. 1B, the method may further include step 104.

In step 104, current power supply information of the terminal is obtained.

For example, after receiving the cover closed instruction, the laptop may detect a power interface for an external power supply. If the power interface is connected to an external power supply, the power supply information of the terminal indicates presence of an external power supply. If the power interface is not connected to an external power supply, the power supply information of the terminal indicates absence of an external power supply.

Determination of an operation that needs to be performed by the terminal based on the program currently running on the terminal in step 103 may be implemented by step 1031 where the operation that needs to be performed by the terminal is determined based on the program currently running on the terminal and the current power supply information of the terminal.

For example, different operations are required to be performed by the laptop due to different programs currently running on the laptop and different power supply information of the laptop.

For example, if the user is currently editing a document and an external power supply is available, the laptop, after receiving a cover closed instruction, may save the currently edited document and then sleep. The laptop may directly open the document required by the user next time when the laptop is turned on. As a result, it is avoided to lose the content edited by the user. For example, if the user is currently editing a document and no external power supply is available, the laptop, after receiving a cover closed instruction, may save the currently edited document and then shut down. As a result, standby time of a battery of the laptop is increased. For example, if the user is currently watching a video and no external power supply is available, the laptop, after receiving a cover closed instruction, may record the playing position of the video and then shut down. The laptop may open related player of the video and play the video from the playing position recorded when the user opens the laptop next time. For example, if the user is currently downloading a document or a video and an external power supply is available, the laptop, after receiving a cover closed instruction, may maintain normal operation status in order to avoid interruption of the download. As a result, download speed is enhanced. For example, if the user is currently downloading a document or a video and no external power supply is available, the laptop, after receiving a cover closed instruction, may sleep in order to reduce power consumption and increase standby time. To sum up, different operations that need to be performed by the terminal may be determined based on different programs currently running on the terminal and the power supply information, and thus various demands of the user can be met.

In the technical solutions provided in the examples of the present disclosure, after the user closes the upper cover and the lower cover of the terminal, the terminal may determine, based on the program currently running on the terminal and the power supply information, whether to shut down, sleep, maintain normal operation, or screen off. As a result, operation flexibility of the terminal is improved based on the current situation, various needs of users can be met and thus the user experience is improved.

Figure 1C:
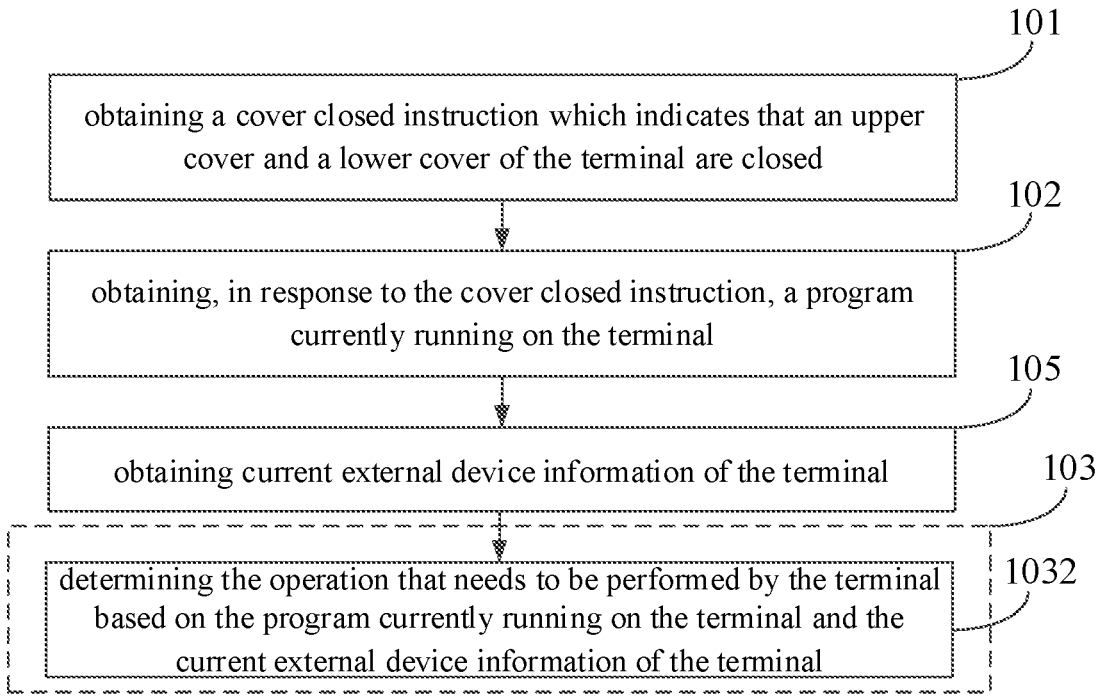
FIG. 1C is a flow diagram of a method for terminal control according to an example.

In an example, as shown in FIG. 1C, the method may further include step 105.

In step 105, current external device information of the terminal is obtained.

For example, the laptop, after receiving the cover closed instruction, may detect various interface for external devices to determine whether there is any external device. For example, an High Definition Multimedia Interface (HDMI) for an external high-definition display may be detected to determine whether there is connected an external display or a Virtual Reality (VR) device. For example, a Video Graphics Array (VGA) for an external common display may be detected to determine whether there is connected an external display. For example, a Digital Visual Interface (DVI) may be detected to determine whether there is connected an external video player. For example, a Universal Serial Bus (USB) interface may be detected to determine whether there is connected a Bluetooth headset.

Determination of an operation that needs to be performed by the terminal based on the program currently running on the terminal in step 103 may be implemented by step 1032 where the operation that needs to be performed by the terminal is determined based on the program currently running on the terminal and the current external device information of the terminal.

For example, if the user is currently editing a document and an external display is connected, the laptop, after receiving a cover closed instruction, may maintain the normal operation status. For example, if the user is currently editing a document and no external device is connected, the laptop, after receiving a cover closed instruction, may save the currently edited document and then shut down. As a result, standby time of a battery of the laptop is increased. For example, if the user is currently watching a video and an external display is connected, the laptop, after receiving a cover closed instruction, may maintain the normal operation status. For example, if the user is currently watching a video and no external device is connected, the laptop, after receiving a cover closed instruction, may record the playing position of the video and then sleep. The laptop may be woken up and the user may watch the video when the user opens the laptop next time. For example, if the user is currently downloading a document or a video, regardless whether there is detected an external device, the laptop, after receiving a cover closed instruction, may maintain the normal operation status. As a result, download speed is enhanced. To sum up, different operations that need to be performed by the terminal may be determined based on different programs currently running on the terminal and the external device information, and thus various demands of the user can be met.

In the technical solutions provided in the examples of the present disclosure, after the user closes the upper cover and the lower cover of the terminal, the terminal may determine, based on the program currently running on the terminal and the external device information, whether to shut down, sleep, maintain normal operation, or screen off. As a result, operation flexibility of the terminal is improved based on the current situation, various needs of users can be met and thus the user experience is improved.

In an example, during determination of the operation that needs to be performed by the terminal based on the program currently running on the terminal and the current external device information, the terminal may maintain the normal operation status if there is a program currently running on the terminal and an external display is connected.

For example, if there is a program running on the laptop and an external display is connected via an HDMI interface or a VGA interface, the user may currently uses the laptop through the external display. In this case, the laptop may maintain the normal operation status when the user closes the upper cover and lower cover of the laptop. That is, when the laptop receives the cover closed instruction, it may maintain the normal operation status so that the user can continue to use the laptop through the external display.

In the technical solutions provided in the examples of the present disclosure, if there is a program running on the terminal and an external display is connected to the terminal, the user may currently uses the program currently running on the terminal through the external display. Thus, after the user closes the upper cover and the lower cover of the terminal, the terminal may maintain the normal operation status. As a result, operation flexibility of the terminal is improved based on the current situation, various needs of users can be met and thus the user experience is improved.

Figure 1D:
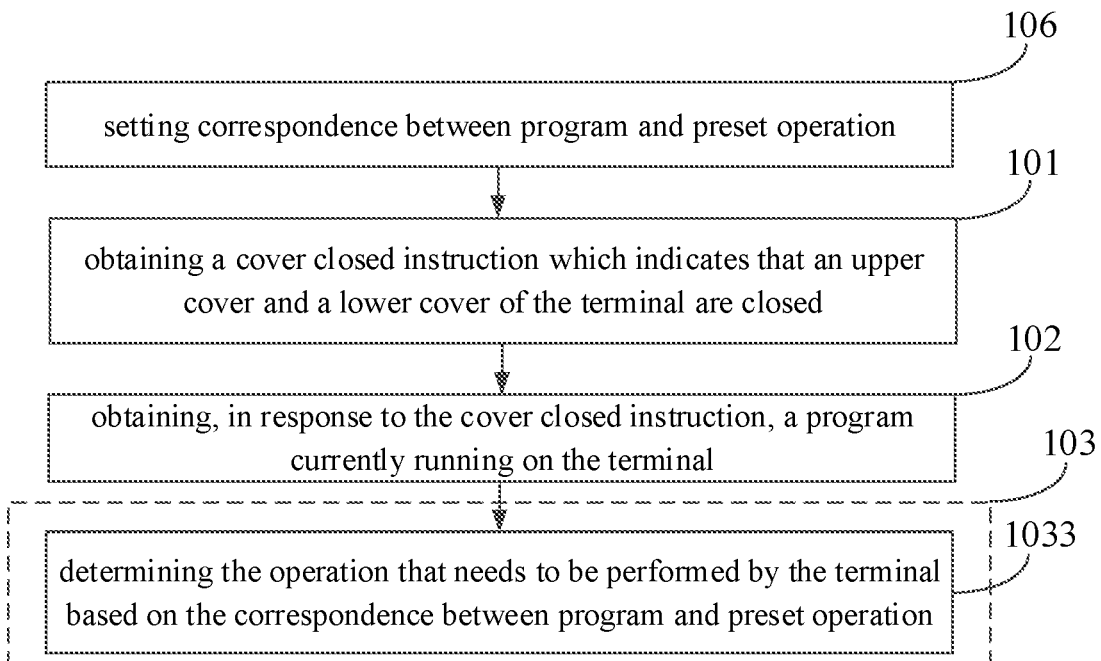
FIG. 1D is a flow diagram of a method for terminal control according to an example.

In an example, as shown in FIG. 1D, the method may further include step 106.

In step 106, correspondence between program and preset operation is set.

For example, during initialization, the correspondence between the running program and the presetting operation may be set in the laptop. The correspondence indicates that different programs may correspond to different preset operations. Specifically, the correspondence between program and preset operation may be as shown in Table 1.

TABLE 1

| Correspondence between program and preset operation | |
|---|---|
| Program | Preset operation |
| Browser | Shutdown |
| Video player | Sleep |
| Download | Maintaining normal operation status |
| Music player | Screen off |

Determination of an operation that needs to be performed by the terminal based on the program currently running on the terminal in step 103 may be implemented by step 1033 where the operation that needs to be performed by the terminal is determined based on the correspondence between program and preset operation.

For example, the laptop, after receiving the cover closed instruction, may obtain the program currently running on the laptop, query Table 1 based on the currently running program, determine a preset operation corresponding to the currently running program, and then take the preset operation as the operation to be performed.

In the technical solutions provided by the examples of the present disclosure, the terminal may determine the operation that needs to be performed based on the preset correspondence between program and preset operation, so that the terminal may select a suitable operation based on current situation more accurately, and thus the user experience can be improved.

Figure 1E:
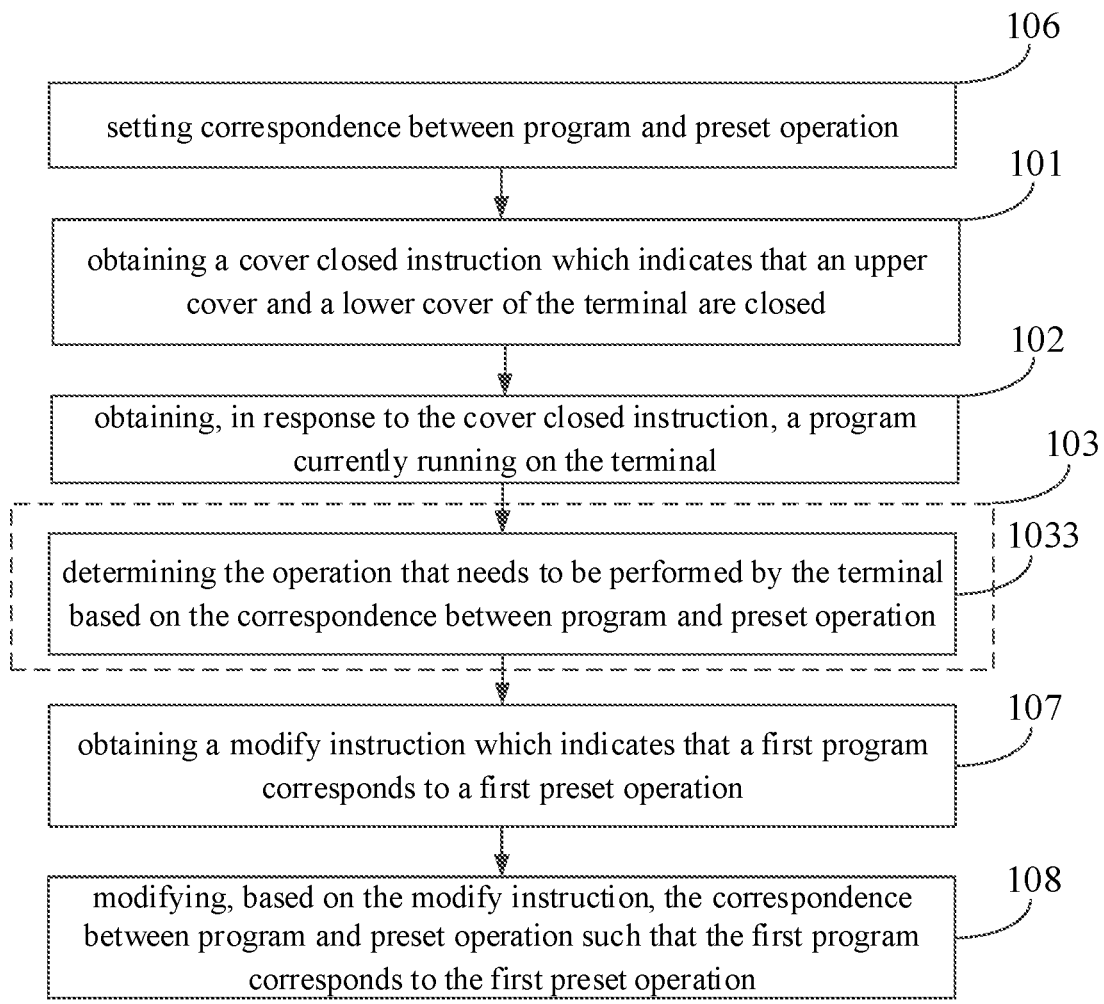
FIG. 1E is a flow diagram of a method for terminal control according to an example.

In an example, as shown in FIG. 1E, the method may further include steps 107 and 108.

In step 107, a modify instruction is obtained. The modify instruction indicates that a first program corresponds to a first preset operation.

For example, the user, when using the laptop, may adjust the correspondence between program and preset operation based on his own demands so that different programs may correspond to different preset operations based on user requirements.

For example, if the user needs to modify the correspondence between program and preset operation, a setting page on the laptop may be viewed. On the setting page, there are listed multiple programs currently installed on the laptop and multiple potential operations such as shutdown, sleep, maintaining normal operation or screen off. The user may modify connection relationship between different programs and different operations based on his own demands. When the laptop detects that the user modifies the connection relationship between the first program and the first preset operation, it determines that the modify instruction is received. The first program may be any of a plurality of programs installed on the laptop. The first preset operation may be any of shutdown, sleep, maintaining normal operation or screen off.

Alternatively, when the user remotely operates the laptop, the modify instruction indicating that the first program corresponds to the first preset operation may also be sent to the laptop through another control terminal.

In step 108, the correspondence between program and preset operation is modified based on the modify instruction, such that the first program corresponds to the first preset operation.

For example, the laptop, after receiving the modify instruction, may save the connection result of the last modification by the user as a new correspondence between program and preset operation.

Alternatively, the laptop, after receiving the modify instruction sent by another control terminal, may obtains the correspondence between the first program and the first preset operation included in the modify instruction, and then modify the preset correspondence between program and preset operation based on the correspondence between the first program and the first preset operation.

In the case that the modify instruction includes correspondence between browser and sleep, the laptop, after obtaining the modify instruction, may modify the Table 1 based on the modify instruction to obtain the new correspondence between program and preset operation. The new correspondence between program and preset operation is shown in Table 2 below.

TABLE 2

Modified correspondence between program and preset operation

| Program | Preset operation |
|---|---|
| Browser | Sleep |
| Video player | Sleep |
| Download | Maintaining normal operation status |
| Music player | Screen off |

In the technical solutions provided by the examples of the present disclosure, the user may modify the preset correspondence between program and preset operation based on the user's habits and preferences, so that the terminal may select suitable operation based on demands of the user and the current situation, and thus the user experience can be improved.

Implementations will be described in detail with several examples.

Figure 2:
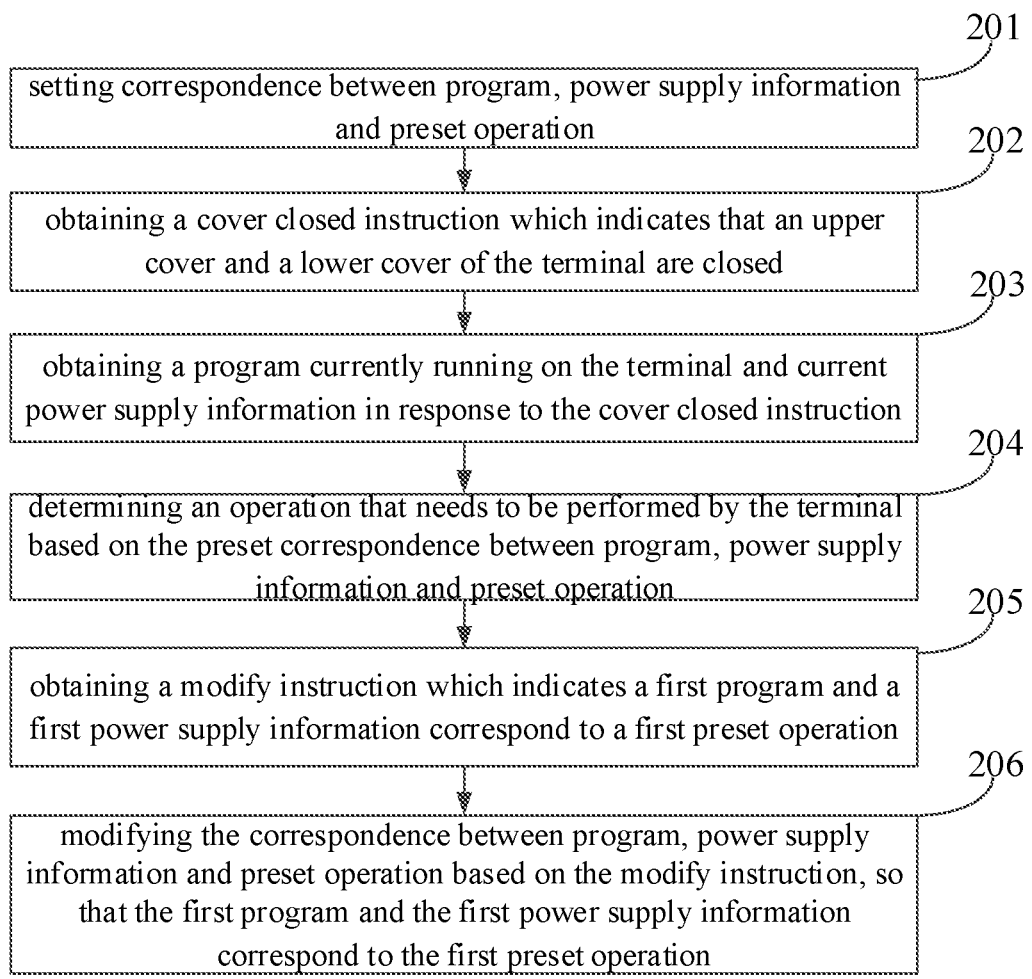
FIG. 2 is a flow diagram of a method for terminal control according to an example.

FIG. 2 is a flow diagram of a method for terminal control according to an example. The method may be implemented by the terminal. As shown in FIG. 2, the method includes steps 201-206.

In step 201, correspondence between program, power supply information and preset operation is set.

For example, the correspondence between program, power supply information and preset operation may be shown in Table 3.

TABLE 3

Correspondence between program, power supply information and preset operation

| Program | Power supply information | Preset operation |
|---|---|---|
| Document | External power supply is available | Sleep |
| | No external power supply is available | Shutdown |
| Browser | External power supply is available | Sleep |
| | No external power supply is available | Shutdown |
| Video player | External power supply is available | Sleep |
| | No external power supply is available | Shutdown |
| Download | External power supply is available | Maintaining normal operation status |
| | No external power supply is available | Maintaining normal operation status |
| Music player | External power supply is available | Screen off |
| | No external power supply is available | Shutdown |

In step 202, a cover closed instruction is obtained. The cover closed instruction indicates that the upper cover and the lower cover of the terminal are closed.

In step 203, a program currently running on the terminal and current power supply information is obtained in response to the cover closed instruction.

In step 204, an operation that needs to be performed by the terminal is determined based on the preset correspondence between program, power supply information and preset operation.

For example, the terminal may, based on the obtained current running program and power supply information, query Table 3 to obtain different preset operations which correspond to different programs and different power supply information, and take the queried preset operations as the operations that need to be performed by the terminal.

In step 205, a modify instruction is obtained. The modify instruction indicates a first program and a first power supply information correspond to a first preset operation.

In step 206, the correspondence between program, power supply information and preset operation is modified based on the modify instruction, so that the first program and the first power supply information correspond to the first preset operation.

In the method for terminal control provided in the examples of the present disclosure, after the user closes the upper cover and the lower cover of the terminal, the terminal may determine, based on the program currently running on the terminal and the current power supply information, whether to shut down, sleep, maintain normal operation, or screen off. As a result, operation flexibility of the terminal is improved based on the current situation, various needs of users can be met and thus the user experience is improved.

Figure 3:
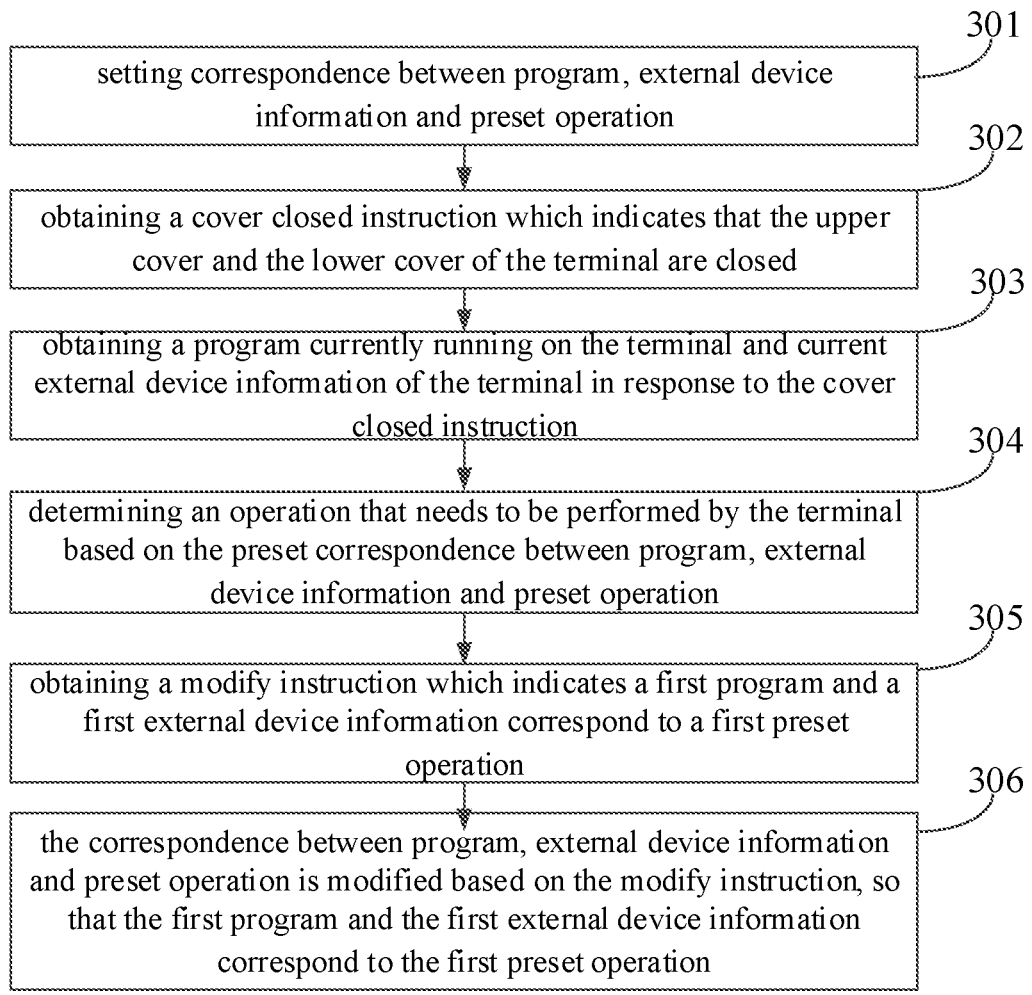
FIG. 3 is a flow diagram of a method for terminal control according to an example.

FIG. 3 is a flow diagram of a method for terminal control according to an example. The method may be implemented by the terminal. As shown in FIG. 3, the method includes steps 301-306.

In step 301, correspondence between program, external device information and preset operation is set.

For example, the correspondence between program, external device information and preset operation may be shown in Table 4.

TABLE 4

Correspondence between program, external device information and preset operation

| Program | External device information | Preset operation |
| --- | --- | --- |
| Document | External display is connected | Maintaining normal operation status |
|  | No external display is connected | Sleep |
| Browser | External display is connected | Maintaining normal operation status |
|  | No external display is connected | Shutdown |
| Video player | External display is connected | Maintaining normal operation status |
|  | No external display is connected | Sleep |
| Download | External display is connected | Maintaining normal operation status |
|  | No external display is connected | Maintaining normal operation status |
| Music player | External display is connected | Screen off |
|  | No external display is connected | Shutdown |

In step 302, a cover closed instruction is obtained. The cover closed instruction indicates that the upper cover and the lower cover of the terminal are closed.

In step 303, a program currently running on the terminal and current external device information of the terminal is obtained in response to the cover closed instruction.

In step 304, an operation that needs to be performed by the terminal is determined based on the preset correspondence between program, external device information and preset operation.

For example, the terminal may, based on the obtained current running program and the current external device information, query Table 4 to obtain different preset operations which correspond to different programs and different external device information, and take the queried preset operations as the operations that need to be performed by the terminal.

In step 305, a modify instruction is obtained. The modify instruction indicates a first program and a first external device information correspond to a first preset operation.

In step 306, the correspondence between program, external device information and preset operation is modified based on the modify instruction, so that the first program and the first external device information correspond to the first preset operation.

In the method for terminal control provided in the examples of the present disclosure, after the user closes the upper cover and the lower cover of the terminal, the terminal may determine, based on the program currently running on the terminal and the current external device information, whether to shut down, sleep, maintain normal operation, or screen off. As a result, operation flexibility of the terminal is improved based on the current situation, various needs of users can be met and thus the user experience is improved.

Figure 4:
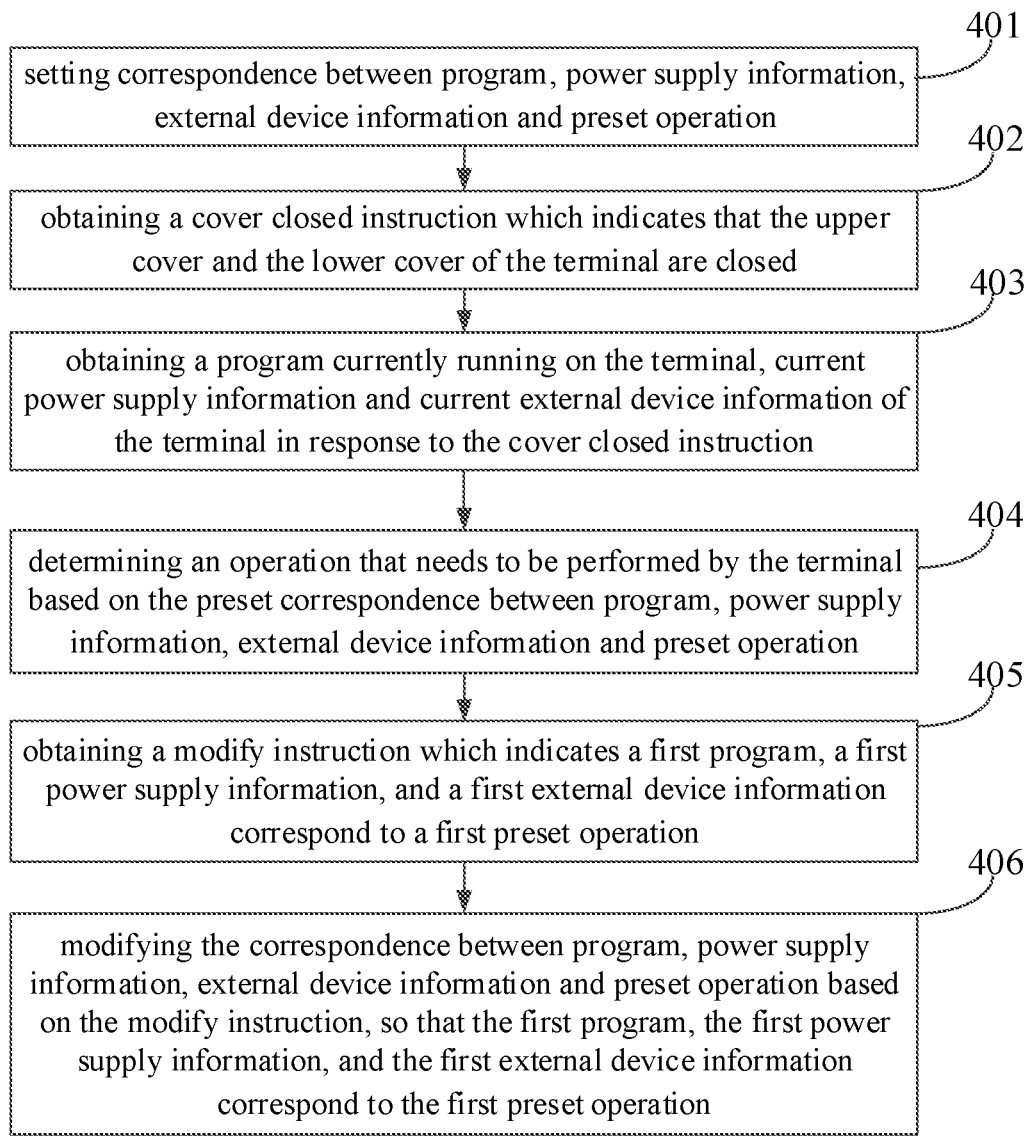
FIG. 4 is a flow diagram of a method for terminal control according to an example.

FIG. 4 is a flow diagram of a method for terminal control according to an example. The method may be implemented by the terminal. As shown in FIG. 4, the method includes steps 401-406.

In step 401, correspondence between program, power supply information, external device information and preset operation is set.

For example, the correspondence between program, power supply information, external device information and preset operation may be shown in Table 5.

TABLE 5

Correspondence between program, power supply information, external device information and preset operation

| Program | Power supply information | External device information | Preset operation |
| --- | --- | --- | --- |
| Document | External power supply is available | External display is connected | Maintaining normal operation status |
|  |  | No external display is connected | Sleep |
|  | No external power supply is available | External display is connected | Maintaining normal operation status |
|  |  | No external display is connected | Shutdown |
| Browser | External power supply is available | External display is connected | Maintaining normal operation status |
|  |  | No external display is connected | Sleep |
|  | No external power supply is available | External display is connected | Maintaining normal operation status |
|  |  | No external display is connected | Shutdown |
| Video player | External power supply is available | External display is connected | Maintaining normal operation status |
|  |  | No external display is connected | Sleep |
|  | No external power supply is available | External display is connected | Maintaining normal operation status |
|  |  | No external display is connected | Shutdown |
| Download | External power supply is available | External display is connected | Maintaining normal operation status |
|  |  | No external display is connected | Sleep |
|  | No external power supply is available | External display is connected | Maintaining normal operation status |
|  |  | No external display is connected | Shutdown |
| Music player | External power supply is available | External display is connected | Screen off |
|  |  | No external display is connected | Screen off |
|  | No external power supply is available | External display is connected | Shutdown |
|  |  | No external display is connected | Shutdown |

In step 402, a cover closed instruction is obtained. The cover closed instruction indicates that the upper cover and the lower cover of the terminal are closed.

In step 403, a program currently running on the terminal, current power supply information and current external device information of the terminal is obtained in response to the cover closed instruction.

In step 404, an operation that needs to be performed by the terminal is determined based on the preset correspondence between program, power supply information, external device information and preset operation.

For example, the terminal may, based on the obtained current running program the current power supply information, and the current external device information, query Table 5 to obtain different preset operations which correspond to different programs, different power supply information, and different external device information, and take the queried preset operations as the operations that need to be performed by the terminal.

In step 405, a modify instruction is obtained. The modify instruction indicates a first program, a first power supply information, and a first external device information correspond to a first preset operation.

In step 406, the correspondence between program, power supply information, external device information and preset operation is modified based on the modify instruction, so that the first program, the first power supply information, and the first external device information correspond to the first preset operation.

In the method for terminal control provided in the examples of the present disclosure, after the user closes the upper cover and the lower cover of the terminal, the terminal may determine, based on the program currently running on the terminal, the current power supply information and the current external device information, whether to shut down, sleep, maintain normal operation, or screen off. As a result, operation flexibility of the terminal is improved based on the current situation, various needs of users can be met and thus the user experience is improved.

Description will be made below for examples of an apparatus which may implement the methods in the above examples.

Figure 5A:
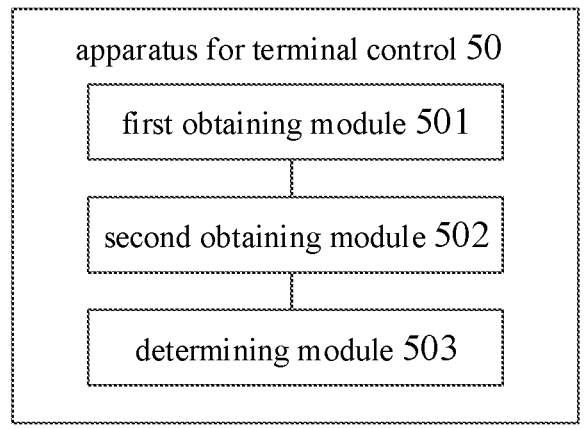
FIG. 5A is a schematic structure diagram of an apparatus for terminal control according to an example.

FIG. 5A is a schematic structure diagram of an apparatus 50 for terminal control according to an example. The apparatus 50 may be implemented as part or entire of an electronic device through software, hardware, or a combination thereof. As shown in FIG. 5A, the apparatus 50 for terminal control includes a first obtaining module 501, a second obtaining module 502, and a determining module 503.

The first obtaining module 501 is configured to obtain a cover closed instruction which indicates that the upper cover and the lower cover of the terminal are closed.

The second obtaining module 502 is configured to obtain, in response to the cover closed instruction, a program currently running on the terminal.

The determining module 503 is configured to determine an operation that needs to be performed by the terminal based on the program currently running on the terminal. The operation that needs to be performed by the terminal includes any one of shutdown, sleep, maintaining normal operation, or screen off.

Figure 5B:
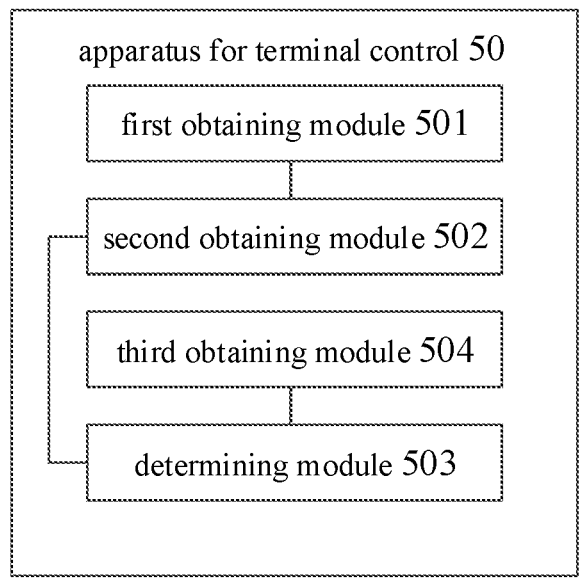
FIG. 5B is a schematic structure diagram of an apparatus for terminal control according to an example.

In an example, as shown in FIG. 5B, the apparatus 50 further includes a third obtaining module 504.

The third obtaining module 504 is configured to obtain current power supply information of the terminal.

The determining module 503 is configured to determine the operation that needs to be performed by the terminal based on the program currently running on the terminal and the current power supply information of the terminal.

Figure 5C:
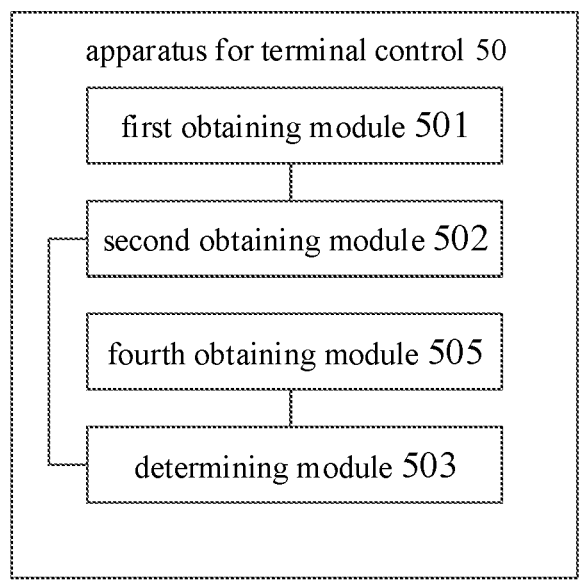
FIG. 5C is a schematic structure diagram of an apparatus for terminal control according to an example.

In an example, as shown in FIG. 5C, the apparatus 50 further includes a fourth obtaining module 505.

The fourth obtaining module 505 is configured to obtain current external device information of the terminal.

The determining module 503 is configured to determine the operation that needs to be performed by the terminal based on the program currently running on the terminal and the current external device information of the terminal.

Figure 5D:
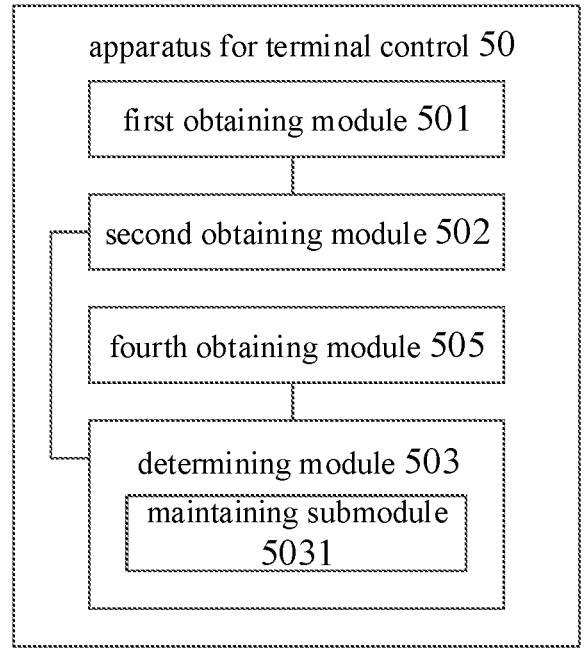
FIG. 5D is a schematic structure diagram of an apparatus for terminal control according to an example.

In an example, as shown in FIG. 5D, the determining module 503 includes a maintaining submodule 5031.

The maintaining submodule 5031 is configured to maintain normal operation status of the terminal when there is a program currently running on the terminal and an external display is connected to the terminal.

Figure 5E:
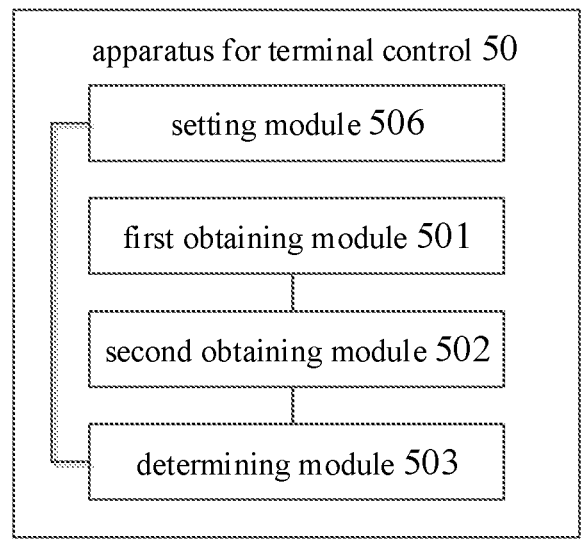
FIG. 5E is a schematic structure diagram of an apparatus for terminal control according to an example.

In an example, as shown in FIG. 5E, the apparatus 50 further includes a setting module 506.

The setting module 506 is configured to set correspondence between program and preset operation.

The determining module 503 is configured to determine the operation that needs to be performed by the terminal based on the correspondence between program and preset operation.

Figure 5F:
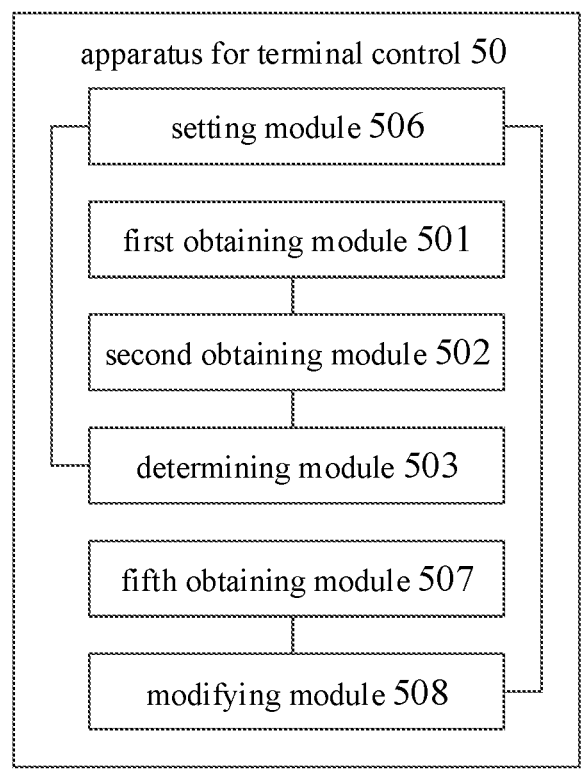
FIG. 5F is a schematic structure diagram of an apparatus for terminal control according to an example.

In an example, as shown in FIG. 5F, the apparatus 50 further includes a fifth obtaining module 507 and a modifying module 508.

The fifth obtaining module 507 is configured to obtain a modify instruction which indicates that a first program corresponds to a first preset operation.

The modifying module 508 is configured to modify, based on the modify instruction, the correspondence between program and preset operation such that the first program corresponds to the first preset operation.

With the apparatus for terminal control provided in the examples of the present disclosure, after the user closes the upper cover and the lower cover of the terminal, the apparatus may determine, based on the program currently running on the terminal, the current power supply information and/or the current external device information, whether to shut down, sleep, maintain normal operation, or screen off. As a result, operation flexibility of the terminal is improved based on the current situation, various needs of users can be met and thus the user experience is improved.

There is provided an apparatus for terminal control in the examples of the present disclosure. The apparatus for terminal control includes a processor and a memory to store processor-executable instructions. The processor is configured to: obtain a cover closed instruction, wherein the cover closed instruction indicates that the upper cover and the lower cover of the terminal are closed; obtain, in response to the cover closed instruction, a program currently running on the terminal; and determine an operation that needs to be performed by the terminal based on the program currently running on the terminal. The operation that needs to be performed by the terminal includes any one of shutdown, sleep, maintaining normal operation, or screen off.

In an example, the processor may be further configured to obtain current power supply information of the terminal, and determine the operation that needs to be performed by the terminal based on the program currently running on the terminal and the current power supply information of the terminal.

In an example, the processor may be further configured to obtain current external device information of the terminal, and determine the operation that needs to be performed by the terminal based on the program currently running on the terminal and the current external device information of the terminal.

In an example, the processor may be further configured to maintain normal operation status of the terminal when there is a program currently running on the terminal and an external display is connected to the terminal.

In an example, the processor may be further configured to set correspondence between program and preset operation, and determine the operation that needs to be performed by the terminal based on the correspondence between program and preset operation.

In an example, the processor may be further configured to obtain a modify instruction which indicates that a first program corresponds to a first preset operation, and modify, based on the modify instruction, the correspondence between program and preset operation such that the first program corresponds to the first preset operation.

With the apparatus for terminal control provided in the examples of the present disclosure, after the user closes the upper cover and the lower cover of the terminal, the apparatus may determine, based on the program currently running on the terminal, the current power supply information and/or the current external device information, whether to shut down, sleep, maintain normal operation, or screen off. As a result, operation flexibility of the terminal is improved based on the current situation, various needs of users can be met and thus the user experience is improved.

For the apparatuses in the above examples, specific operations performed by each module have been detailed in related method examples, and thus detailed description will be omitted here.

Figure 6:
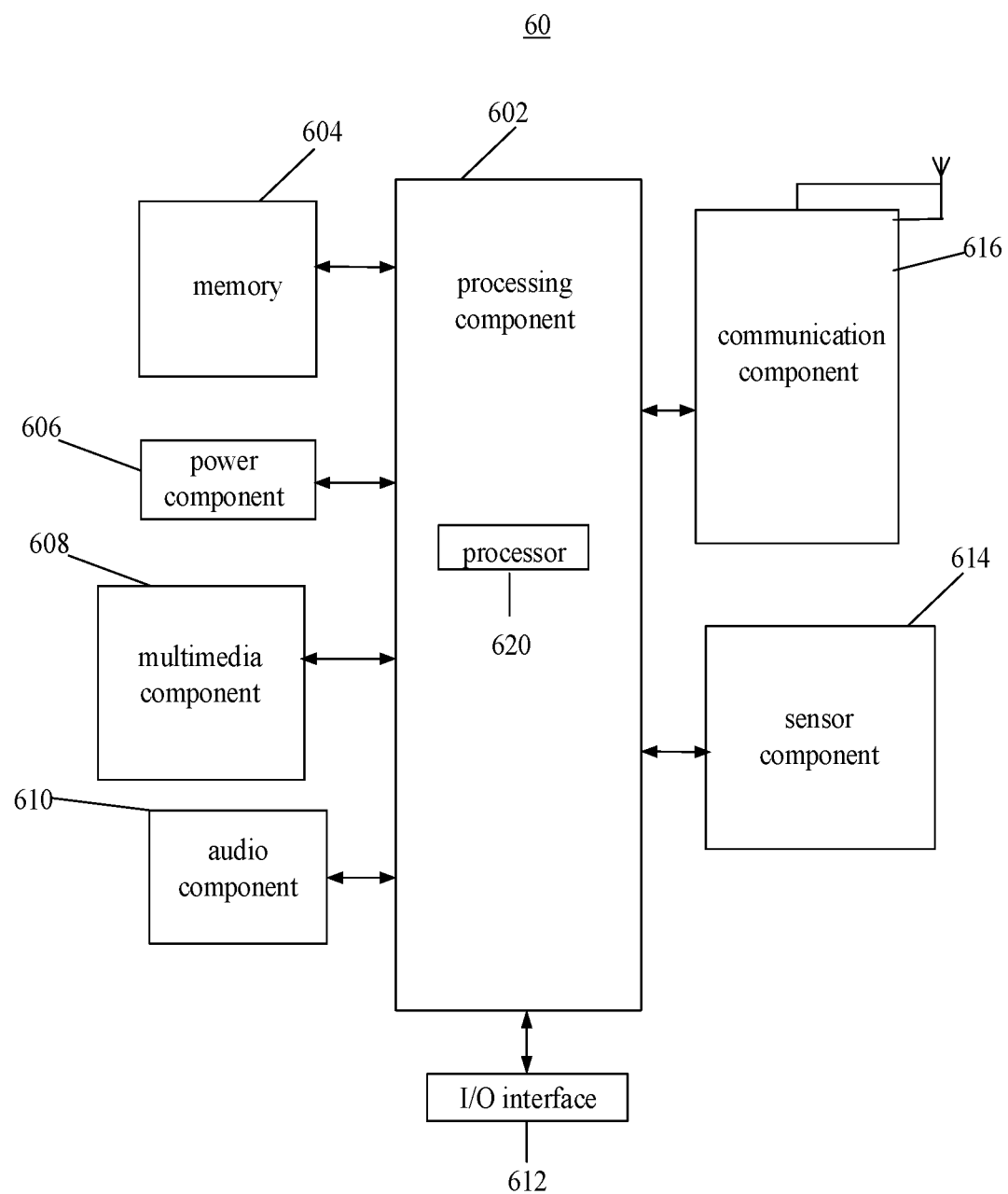
FIG. 6 is block diagram of an apparatus for terminal control according to an example.

FIG. 6 is a block diagram illustrating an apparatus 60 for terminal control according to an example. The apparatus 60 may be applied for a terminal. For example, the apparatus 60 may be a mobile phone, a computer, a digital broadcast terminal, a messaging device, a gaming console, a tablet, a medical device, exercise equipment, a personal digital assistant, and the like.

The apparatus 60 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 60, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 60. Examples of such data include instructions for any applications or methods operated on the apparatus 60, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 60. The power component 606 may include a power management system, one or more power sources, and any other components associated with the generation, management, and distribution of power for the apparatus 60.

The multimedia component 608 includes a screen providing an output interface between the apparatus 60 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 608 includes a front camera and/or a rear camera. The front camera and the rear camera may receive an external multimedia datum while the apparatus 60 is in an operation mode, such as a photographing mode or a video mode. Each of the front camera and the rear camera may be a fixed optical lens system or have optical focusing and zooming capability.

The audio component 610 is configured to output and/or input audio signals. For example, the audio component 610 includes a microphone ("MIC") configured to receive an external audio signal when the apparatus 60 is in an operation mode, such as a call mode, a recording mode, and a voice recognition mode. The received audio signal may be further stored in the memory 604 or transmitted via the communication component 616. In some examples, the audio component 610 further includes a speaker to output audio signals.

The I/O interface 612 provides an interface between the processing component 602 and peripheral interface modules, the peripheral interface modules being, for example, a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 60. For instance, the sensor component 614 may detect an open/closed status of the apparatus 60, relative positioning of components (e.g., the display and the keypad, of the apparatus 60), a change in position of the apparatus 60 or a component of the apparatus 60, a presence or absence of user contact with the apparatus 60, an orientation or an acceleration/deceleration of the apparatus 60, and a change in temperature of the apparatus 60. The sensor component 614 may include a proximity sensor configured to detect the presence of a nearby object without any physical contact. The sensor component 614 may also include a light sensor, such as a CMOS or CCD image sensor, for use in imaging applications. In some examples, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 60 and other devices. The apparatus 60 can access a wireless network based on a communication standard, such as WiFi, 2G, or 3G, or a combination thereof. In an example, the communication component 616 receives a broadcast signal or broadcast associated information from an external broadcast management system via a broadcast channel. In an example, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 60 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 604, executable by the processor 620 in the apparatus 60, for performing the above-described methods. For example, the non-transitory computer-readable storage medium may be a ROM, a Random Access Memory (RAM), a CD-ROM, a magnetic tape, a floppy disc, an optical data storage device, and the like.

A non-transitory computer readable storage medium having stored therein instructions that, when executed by a processor of the apparatus 60, cause the apparatus 60 to perform a method for terminal control. The method may include: obtaining a cover closed instruction, wherein the cover closed instruction indicates that the upper cover and the lower cover of the terminal are closed; obtaining, in response to the cover closed instruction, a program currently running on the terminal; and determining an operation that needs to be performed by the terminal based on the program currently running on the terminal, wherein the operation that needs to be performed by the terminal includes any one of shutdown, sleep, maintaining normal operation, or screen off.

In an example, the method may further include obtaining current power supply information of the terminal. The determining an operation that needs to be performed by the terminal based on the program currently running on the terminal may include: determining the operation that needs to be performed by the terminal based on the program currently running on the terminal and the current power supply information of the terminal.

In an example, the method further includes: obtaining current external device information of the terminal. The determining an operation that needs to be performed by the terminal based on the program currently running on the terminal includes: determining the operation that needs to be performed by the terminal based on the program currently running on the terminal and the current external device information of the terminal.

In an example, the determining the operation that needs to be performed by the terminal based on the program currently running on the terminal and the current external device information of the terminal includes: maintaining normal operation status of the terminal when there is a program currently running on the terminal and an external display is connected to the terminal.

In an example, the method further includes: setting correspondence between program and preset operation. The determining an operation that needs to be performed by the terminal based on the program currently running on the terminal includes: determining the operation that needs to be performed by the terminal based on the correspondence between program and preset operation.

In an example, the method further includes: obtaining a modify instruction, wherein the modify instruction indicates that a first program corresponds to a first preset operation; and modifying, based on the modify instruction, the correspondence between program and preset operation such that the first program corresponds to the first preset operation.

In practice, the instructions stored in the computer readable storage medium may also be a computer program. When the program in the storage medium is executed by the processor of the apparatus 60, the apparatus 60 may be configured to execute any of the methods for terminal control described above.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the inventive concept is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a terminal, comprising:
obtaining a cover closing instruction for the terminal, wherein the cover closing instruction indicates that an upper cover and a lower cover of the terminal are closed;
obtaining, in response to the cover closing instruction, a program running on the terminal;
obtaining information of an external device of the terminal, wherein the external device includes a non-power-supply device;
determining an operation to be performed by the terminal based on the program running on the terminal, wherein the operation to be performed by the terminal comprises any one of:
shutdown, sleep, maintaining normal operation, and screen off;
establishing a correspondence between a program and a preset operation;
wherein determining the operation to be performed by the terminal based on the program running on the terminal comprises:

determining the operation to be performed by the terminal based on both of the program running on the terminal and the information of the external device; and determining the operation to be performed by the terminal further based on the correspondence between the program and the preset operation;

obtaining a modifying instruction, wherein the modifying instruction indicates that a first program corresponds to a first preset operation; and modifying, based on the modifying instruction, the correspondence between program and preset operation such that the first program corresponds to the first preset operation upon obtaining the cover closing instruction.

2. The method of claim 1, further comprising:
obtaining power supply information of the terminal;
wherein determining the operation to be performed by the terminal based on the program running on the terminal comprises:
determining the operation to be performed by the terminal further based on the power supply information of the terminal.

3. The method of claim 1, wherein determining the operation to be performed by the terminal based on both of the program running on the terminal and the information of the external device comprises:
maintaining a normal operation status of the terminal when the program running on the terminal exists and an external display is connected to the terminal.

4. An apparatus for controlling a terminal, comprising:
a processor; and
a memory storing instructions that are executable by the processor;
wherein the processor is configured to:
obtain a cover closing instruction for the terminal, wherein the cover closing instruction indicates that an upper cover and a lower cover of the terminal are closed;
obtain, in response to the cover closing instruction, a program running on the terminal;
obtain information of an external device of the terminal, wherein the external device includes a non-power-supply device;
determine an operation to be performed by the terminal based on both of the program running on the terminal and the information of the external device, wherein the operation to be performed by the terminal comprises any one of: shutdown, sleep, maintaining normal operation, or screen off;
establishing a correspondence between a program and a preset operation;
wherein determining the operation to be performed by the terminal based on the program running on the terminal comprises:
determining the operation to be performed by the terminal based on both of the program running on the terminal and the information of the external device; and
determining the operation to be performed by the terminal further based on the correspondence between the program and the preset operation;
obtaining a modifying instruction, wherein the modifying instruction indicates that a first program corresponds to a first preset operation; and
modifying, based on the modifying instruction, the correspondence between program and preset operation such that the first program corresponds to the first preset operation upon obtaining the cover closing instruction.

5. The apparatus of claim 4, wherein the processor is further configured to:
obtain power supply information of the terminal;
determine the operation to be performed by the terminal further based on the power supply information of the terminal.

6. The apparatus of claim 4, wherein the processor is further configured to maintain a normal operation status of the terminal when the program running on the terminal exists and an external display is connected to the terminal.

7. A non-transitory computer-readable storage medium having a computer program stored thereon for controlling a terminal, wherein the computer program, when executed by a processor, causes the processor to perform:
obtaining a cover closing instruction for the terminal, wherein the cover closing instruction indicates that an upper cover and a lower cover of the terminal are closed;
obtaining, in response to the cover closing instruction, a program running on the terminal;
obtaining information of an external device of the terminal, wherein the external device includes a non-power-supply device;
determining an operation to be performed by the terminal based on both of the program running on the terminal and the information of the external device, wherein the operation to be performed by the terminal comprises any one of: shutdown, sleep, maintaining normal operation, or screen off;
establishing a correspondence between a program and a preset operation;
wherein determining the operation to be performed by the terminal based on the program running on the terminal comprises:
determining the operation to be performed by the terminal based on both of the program running on the terminal and the information of the external device; and
determining the operation to be performed by the terminal further based on the correspondence between the program and the preset operation;
obtaining a modifying instruction, wherein the modifying instruction indicates that a first program corresponds to a first preset operation; and
modifying, based on the modifying instruction, the correspondence between program and preset operation such that the first program corresponds to the first preset operation upon obtaining the cover closing instruction.

8. The non-transitory computer-readable storage medium of claim 7, wherein the computer program further causes the processor to perform:
obtaining power supply information of the terminal; and
determining the operation to be performed by the terminal further based on the power supply information of the terminal.

9. The non-transitory computer-readable storage medium of claim 7, wherein the computer program caused the processor to perform determining the operation to be performed by the terminal based on both of the program running on the terminal and the information of the external device further causes the processor to perform:

maintaining a normal operation status of the terminal when the program running on the terminal exists and an external display is connected to the terminal.

* * * * *